United States Patent
George et al.

(10) Patent No.: US 10,402,806 B2
(45) Date of Patent: Sep. 3, 2019

(54) METHOD AND SYSTEM FOR POS ENABLED INSTALLMENTS WITH ELIGIBILITY CHECK REQUIREMENTS

(71) Applicant: MasterCard International Incorporated, Purchase, NY (US)

(72) Inventors: Sagitha George, Harrow (GB); Vijila Sudhakar, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 358 days.

(21) Appl. No.: 15/142,440

(22) Filed: Apr. 29, 2016

(65) Prior Publication Data

US 2016/0321634 A1    Nov. 3, 2016

Related U.S. Application Data

(60) Provisional application No. 62/160,328, filed on May 12, 2015, provisional application No. 62/154,348, filed on Apr. 29, 2015.

(51) Int. Cl.
G06Q 20/20         (2012.01)
G06Q 20/40         (2012.01)
(Continued)

(52) U.S. Cl.
CPC ......... *G06Q 20/202* (2013.01); *G06Q 20/102* (2013.01); *G06Q 20/401* (2013.01)

(58) Field of Classification Search
USPC ........................................................ 705/21
See application file for complete search history.

(56) References Cited

U.S. PATENT DOCUMENTS 6,327,578 B1    12/2001  Linehan
6,980,968 B1 *  12/2005  Walker ................... G06Q 20/04
                                                705/26.1
(Continued)

FOREIGN PATENT DOCUMENTS

KR    2010-0088949 A    8/2011

OTHER PUBLICATIONS

Notification of Transmittal of the International Search Report and the Written Opinion of the International Searching Authority (Forms PCT/ISA/220, PCT/ISA/210 and PCT/ISA/237 ) dated Jul. 27, 2016, by the International Application Division Korean Intellectual Property Office in corresponding PCT Application No. PCT/US2016/029975. (18 pages).

(Continued)

*Primary Examiner* — Garcia Ade

(74) *Attorney, Agent, or Firm* — Buchanan Ingersoll & Rooney PC

(57) ABSTRACT

A method for processing a transaction with installment checks include: receiving a first transaction message from an acquiring institution, the first transaction message including a primary account number, an installment indicator, and transaction data; determining eligibility for payment via installment based on a comparison of the transaction data to eligibility rules associated with the primary account number; transmitting the first transaction message to a financial institution associated with the primary account number; receiving a second transaction message from the financial institution, the second transaction message including a response code indicative of approval and an eligibility indicator indicating eligibility for payment via installment; and transmitting the second transaction message to the acquiring institution for display to a consumer involved in the related payment transaction on a point of sale system.

10 Claims, 8 Drawing Sheets

(51) Int. Cl.
*G06Q 20/10* (2012.01)
*G06Q 40/00* (2012.01)

(56) References Cited

U.S. PATENT DOCUMENTS

| | | |
|---|---|---|
| 2002/0082987 A1 | 6/2002 | Wilson |
| 2011/0238567 A1 | 9/2011 | Ferreira Da Silva |
| 2012/0109819 A1* | 5/2012 | Aidoo .................... G06Q 10/02 705/40 |

OTHER PUBLICATIONS

Canadian Office Action dated Sep. 17, 2018, issued by the Canadian Intellectual Property Office in corresponding Canadian Application No. 2,984,360. (7 pages).

* cited by examiner

METHOD AND SYSTEM FOR POS ENABLED INSTALLMENTS WITH ELIGIBILITY CHECK REQUIREMENTS

FIELD

The present disclosure relates to the processing of transactions related to installments, specifically the use of eligibility checks to provide for the processing of a transaction as an installment based on consumer selection and the post-authorization processing of a payment transaction as an installment transaction.

BACKGROUND

Traditionally, consumers often purchase products by paying the full purchase price of the product at the time of the transaction. However, in some instances consumers may be able to purchase a product via installments. Installments are periodic payments that may be made by the consumer to the merchant that, over time, result in payment to the merchant of at least the full purchase price. Installments may be beneficial for consumers, as they may be able to spread out a large purchase over time and purchase a product they may have otherwise been unable to save for. Installments may also be beneficial for merchants, as they may have purchases that would not have been made otherwise, and installments may provide for regular income even during periods when fewer sales may occur.

However, installments may be difficult for many merchants to manage. Many merchants lack computing systems that are capable of managing installments, initiating installment transactions, and to seek recourse against consumers in the event that an installment payment is missed. As a result, many merchants are often wary and unwilling to participate in installments. Conversely, financial institutions, such as issuing and acquiring banks, are often equipped to charge their consumers on a periodic basis, have sophisticated computing systems that may handle complex payment schemes, and are experienced in seeking recourse against consumers that miss scheduled payments. Thus, financial institutions may be more suited to participate in installment transactions than merchants.

However, the computing systems used by financial institutions are largely unable to accommodate installment transactions. Existing systems at financial institutions are specially configured for traditional payment transactions, where payment is made in full, and are therefore unable to perform regularly scheduled transactions and to differentiate between a traditional, full payment transaction, and an installment transaction. In addition, financial institutions may require that both types of payments be made available to consumers. As such, computing systems must not only be configured to process and establish installments, but must also be capable of differentiating between traditional, full payment transactions and installment transactions, and for processing each transaction accordingly.

Thus, there is a need for a technical solution to enable the initiation, processing, and management of installment transactions. More particularly, there is a need for a technological improvement to provide for the initiation and processing of installment transaction using existing communication methods and protocols that may enable the implementation of installment transaction using legacy financial systems.

SUMMARY

The present disclosure provides a description of systems and methods for the processing of a transaction with installment checks and the post-authorization generation of an installment. The use of a third party processing server to perform eligibility checks and post-authorization processing may enable merchants and financial institutions to participate in installment transactions without significant modification to legacy systems and expenditure of resources.

A method for processing a transaction with installment checks include: receiving, by a receiving device of a processing server, a first transaction message related to a payment transaction from an acquiring institution, wherein the first transaction message is formatted pursuant to one or more standards and includes a plurality of data elements including at least a first data element configured to store a primary account number, a second data element configured to store an installment indicator, and one or more additional data elements configured to store transaction data; determining, by a determination module of the processing server, eligibility of the related payment transaction for payment via installment based on at least a comparison of the transaction data to one or more eligibility rules associated with an identification value included in the primary account number; electronically transmitting, by a transmitting device of the processing server, the first transaction message to a financial institution associated with the identification value included in the primary account number; receiving, by the receiving device of the processing server, a second transaction message related to the payment transaction from the financial institution, wherein the second transaction message is formatted pursuant to the one or more standards and includes the plurality of data elements included in the first transaction message further including a third data element configured to store a response code indicative of approval of the payment transaction, and an eligibility indicator stored in the second data element or a fourth data element indicating that the related payment transaction is eligible for payment via installment; and electronically transmitting, by the transmitting device of the processing server, the second transaction message to the acquiring institution for display to a consumer involved in the related payment transaction on a point of sale system.

A method for post-authorization generation of an installment includes: storing, in an issuer database of a processing server, an issuer profile, wherein the issuer profile includes a structured data set related to an issuing financial institution including at least an identification number and one or more eligibility rules; receiving, by a receiving device of the processing server, a first transaction message related to a payment transaction, wherein the first transaction message is formatted pursuant to one or more standards and includes a plurality of data elements including at least a first data element configured to store a primary account number, a second data element configured to store an installment indicator, a third data element configured to store a transaction amount, and one or more additional data elements configured to store transaction data; determining, by a determination module of the processing server, eligibility of the related payment transaction for payment via installment based on at least a comparison of the transaction data to the one or more eligibility rules; electronically transmitting, by a transmitting device of the processing server, the first transaction message to the issuing financial institution; receiving, by the receiving device of the processing server, a confirmation from the issuing financial institution to process the related payment transaction as an installment; and initiating, by a transaction processing module of the processing server, an installment transaction for payment of an installment amount based on at least the transaction amount from a transaction account associated with the primary account number, wherein the identification number is included in the primary account number stored in the first data element included in the received first transaction message.

A system for processing a transaction with installment checks includes: a receiving device of a processing server configured to receive a first transaction message related to a payment transaction from an acquiring institution, wherein the first transaction message is formatted pursuant to one or more standards and includes a plurality of data elements including at least a first data element configured to store a primary account number, a second data element configured to store an installment indicator, and one or more additional data elements configured to store transaction data; a determination module of the processing server configured to determine eligibility of the related payment transaction for payment via installment based on at least a comparison of the transaction data to one or more eligibility rules associated with an identification value included in the primary account number; and a transmitting device of the processing server configured to electronically transmit the first transaction message to a financial institution associated with the identification value included in the primary account number. The receiving device of the processing server is further configured to receive a second transaction message related to the payment transaction from the financial institution, wherein the second transaction message is formatted pursuant to the one or more standards and includes the plurality of data elements included in the first transaction message further including a third data element configured to store a response code indicative of approval of the payment transaction, and an eligibility indicator stored in the second data element or a fourth data element indicating that the related payment transaction is eligible for payment via installment. The transmitting device of the processing server is further configured to electronically transmit the second transaction message to the acquiring institution for display to a consumer involved in the related payment transaction on a point of sale system.

A system for post-authorization generation of an installment includes: a transaction processing module of a processing server; an issuer database of the processing server configured to store an issuer profile, wherein the issuer profile includes a structured data set related to an issuing financial institution including at least an identification number and one or more eligibility rules; a receiving device of the processing server configured to receive a first transaction message related to a payment transaction, wherein the first transaction message is formatted pursuant to one or more standards and includes a plurality of data elements including at least a first data element configured to store a primary account number, a second data element configured to store an installment indicator, a third data element configured to store a transaction amount, and one or more additional data elements configured to store transaction data; a determination module of the processing server configured to determine eligibility of the related payment transaction for payment via installment based on at least a comparison of the transaction data to the one or more eligibility rules; and a transmitting device of the processing server configured to electronically transmit the first transaction message to the issuing financial institution. The receiving device of the processing server is further configured to receive a confirmation from the issuing financial institution to process the related payment transaction as an installment. The transaction processing module of the processing server is configured to initiate an installment transaction for payment of an installment amount based on at least the transaction amount from a transaction account associated with the primary account number. The identification number is included in the primary account number stored in the first data element included in the received first transaction message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
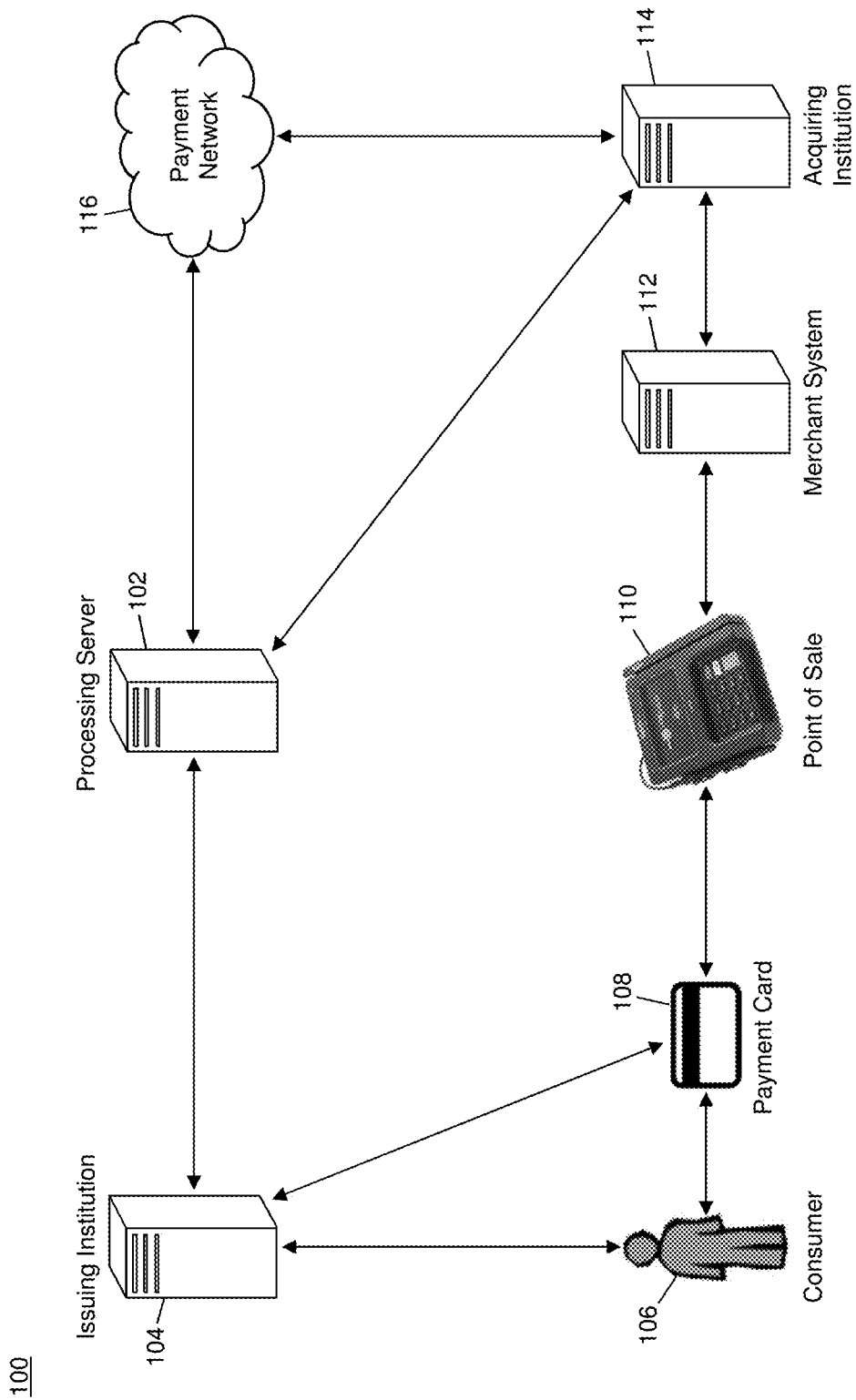
FIG. 1 is a block diagram illustrating a high level system architecture for initiating and processing installment transactions with eligibility check requirements in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for Processing and Initiation of Installments with Eligibility Checks

FIG. 1 illustrates a system 100 for the post-authorization processing and initiation of installment transactions with eligibility checks of payment transactions.

The system 100 may include a processing server 102. The processing server 102, discussed in more detail below, may be configured to initiate and process payment transactions as installment transactions and to perform eligibility checks of payment transactions for conversion to installment transactions. Eligibility checks may be performed by the processing server 102 on payment transactions based on eligibility rules provided by an issuing institution 104 associated with a payment transaction. The issuing institution 104 may be an issuing financial institution, such as an issuing bank, configured to issue transaction accounts to consumers 106 for use in funding payment transactions and installment transactions.

The issuing institution 104 may issue a transaction account to a consumer 106 and may set one or more rules regarding the use of the transaction account to fund installment transactions. The rules may be based on any suitable criteria associated with the transaction account and/or a payment transaction, such as, for example, a transaction amount, geographic location, merchant industry, product data, account balance, etc. For instance, in an example, the issuing institution 104 may issue a transaction account to the consumer 106 for use in funding traditional payment transactions, and for also funding installment transactions for transactions between $500 and $2,000 with a pre-defined list of merchants. In some instances, an issuing institution 104 may use the same eligibility rules for all transaction accounts associated therewith. In other instances, an issuing institution 104 may set eligibility rules for ranges of accounts or for individual transaction accounts.

The issuing institution 104 may register with the processing server 102 for the processing of payment transactions. As part of the registration, the issuing institution 104 may electronically transmit a data signal to the processing server 102 that is superimposed or otherwise encoded with one or more eligibility rules. The processing server 102 may store the eligibility rules for use in future eligibility checks for payment transactions to be funded by transaction accounts issued by the issuing institution 104. In instances where multiple sets of eligibility rules may be provided, the issuing institution 104 may also provide the criteria for applicability thereby (e.g., what transaction accounts are associated with what sets of eligibility rules). The processing server 102 may store the eligibility rules in a profile associated with the issuing institution 104, discussed in more detail below.

As part of the issuing of a transaction account to the consumer 106 for use in funding installment transactions and payment transactions, the issuing institution 104 may issue a payment card 108 or other payment instrument to the consumer 106. The payment card 108, or other payment instrument that may be issued to the consumer 106 and associated with the transaction account, may be presented at a merchant point of sale 110 for use in conveying payment details during a payment transaction. Payment details may be conveyed to the point of sale 110 from the payment card 108 using any suitable method, such as the reading of a magnetic stripe included in the payment card 108, reading of a machine-readable code displayed on the payment card 108, receipt of a data signal electronically submitted by the payment card 108 using near field communication, etc. Payment details may include at least a primary account number associated with the corresponding transaction account and any additional data used in the processing of payment transactions via the corresponding transaction account, such as a transaction counter, payment cryptogram, consumer name, etc.

The point of sale 110 may receive the payment details from the payment card 108 and may convey the payment details, along with any other transaction data supplied by the consumer 106 (e.g., a personal identification number, signature, receipt preference, donation, reward data, etc.) to a merchant system 112. The merchant system 112 may be associated with a merchant involved in the payment transaction and used to perform functions associated with the initiation of payment transactions. In some embodiments, the point of sale 110 and merchant system 112 may be the same computing device and/or computing system. The merchant system 112 may store transaction data for a payment transaction, and, upon receipt from the point of sale 110, may combine the transaction data with the payment details and other transaction data provided by the point of sale 110. The merchant system 112 may electronically transmit the combined transaction data to an acquiring institution 114 as part of the initiation of the payment transaction for processing.

The acquiring institution 114 may be an acquiring financial institution, such as an acquiring bank, configured to issue transaction accounts to merchant for use in the receipt of funds as part of the processing of payment transactions and installment transactions. In some embodiments, the acquiring institution 114 and the issuing institution 104 may be the same institution, or the acquiring institution 114 may be configured to operate as an issuing institution 104 and vice versa. The acquiring institution 114 may receive the transaction data for the payment transaction from the merchant system 112. The transaction data may include the payment details and any other transaction data used in the processing of payment transaction, such as a transaction amount, transaction time, transaction date, geographic location, merchant name, merchant identifier, merchant category code, other merchant data, issuer data, acquirer data, product data, consumer data, reward data, offer data, loyalty data, etc.

The acquirer institution 114 may be configured to format the transaction data in a transaction message for submission to a payment network 116 for processing. The transaction message may be a specially formatted data message that is formatted pursuant to one or more standards governing the exchange of financial transaction messages, such as the International Organization of Standardization's ISO 8583 or ISO 20022 standards. A transaction message may include a message type indicator indicative of a type of the transaction message, such as an authorization request for transaction messages received by the payment network 114 that require processing. A transaction message may also include a plurality of data elements, where each data element may be configured to store transaction data, such as data elements configured to store a transaction time, a transaction date, a transaction amount, a geographic location, a merchant identifier, a primary account number, product data, merchant data, offer data, loyalty data, reward data, point of sale data, issuer data, acquirer data, currency data, etc. In some instances, a transaction message may also include one or more bitmaps, where each bitmap may indicate the data elements included in the transaction message and the transaction data stored therein.

The acquiring institution 114 may submit the transaction message for the payment transaction to the payment network 116 using payment rails associated with the payment network 116. The transaction message may be an authorization request (e.g., based on the message type indicator included therein) and include a plurality of data elements configured to store the transaction data including at least a first data element configured to store the primary account number read from the payment card 108 and a second data element configured to store an installment indicator. The installment indicator may indicate that the point of sale 110 is configured to perform functions related to the conversion of the payment transaction to an installment, such as the prompting of the consumer 106 for a consumer installment preference, as discussed in more detail below.

The payment network 116 may receive the authorization request and may forward the authorization request to the processing server 102. In some embodiments, the processing server 102 may be a part of the payment network 116 and may receive the authorization request using internal communication methods. In other embodiments, the processing server 102 may be external to the payment network 116 and may receive the authorization request via the payment rails associated with the payment network 116 or other suitable communication network and method. The processing server 102 may analyze the authorization request and identify that the transaction account involved therein is issued by the issuing institution 104, such as based on an issuer identification number, bank identification number, or other value included in the primary account number stored in the corresponding data element. The processing server 102 may then identify the associated issuer profile that includes the eligibility rules provided by the issuing institution 104.

The processing server 102 may apply the eligibility rules to the transaction data stored in the data elements included in the authorization request to determine if the payment transaction is eligible for conversion to an installment transaction. For instance, in the above example, the processing server 102 may determine if the transaction amount is between $500 and $2,000 and if the merchant is one of the pre-approved merchants. If the transaction is not eligible for conversion, the processing server 102 may modify the installment indicator stored in the second data element included in the authorization request accordingly, such as by removing the indicator or modifying the indicator to a specific data value that indicates that the transaction is not eligible. If the transaction is eligible, the processing server 102 may not modify the installment indicator, or may modify the installment indicator to indicate that the eligibility check was performed successfully.

The processing server 102 may then forward the authorization request to the issuing institution 104. In some embodiments, the processing server 102 may be a part of the issuing institution 104 and may forward the authorization request to another computing device in the issuing institution 104 using internal communication methods for processing thereby. In other embodiments, the processing server 102 may be external to the issuing institution 104 and may electronically transmit the authorization request to the issuing institution 104 using the payment rails associated with the payment network 116 or another suitable communication network and method.

The issuing institution 104 may receive the authorization request for the payment transaction and may perform traditional functions related to the processing thereto, such as checking for a sufficient account balance or credit to fund the payment transaction, determining a likelihood of fraud for the payment transaction, etc. If the payment transaction is to be declined, the issuing institution 104 may return a transaction message to the processing server 102 that is an authorization response (e.g., as indicated by the included message type indicator) that includes a data element configured to store a response code indicating that the payment transaction is declined. The authorization response may be a modification of the authorization request or a newly generated transaction message, and may include the plurality of data elements included in the authorization request with the data element configured to store a response code modified or newly included therein. The processing server 102 may receive the authorization response and may forward it to the payment network 116 for forwarding to the acquiring institution 114 and finalization of the payment transaction by the merchant system 112 and consumer 106 accordingly.

If the payment transaction is approved, the issuing institution 104 may determine if the payment transaction is eligible for conversion to an installment. The eligibility check performed by the issuing institution 104 may be based on the same eligibility rules provided to the processing server 102, or may be based on alternative and/or additional rules. For instance, the issuing institution 104 may determine eligibility based on an account balance and credit data of the transaction account, which may be unavailable to the processing server 102. The issuing institution 104 may indicate the result of the eligibility check (e.g., that the payment transaction is eligible for conversion or is not eligible for conversion) in the second data element or in an additional data element included in the authorization response. The authorization response may then be forwarded to the processing server 102. In instances where the payment transaction is eligible for conversion, the issuing institution 104 may identify one or more installment terms, which may be stored in one or more corresponding data elements included in the authorization response. Installment terms may include installment length, number of payments, installment amounts, installment period, installment fees, annual percentage rate, etc.

The processing server 102 may forward the authorization response to the payment network 116, which may, in turn, forward the authorization response to the acquiring institution 114. The acquiring institution 114 may forward the authorization response, or data stored therein, to the merchant system 112. In instances where the payment transaction is determined as not being eligible for conversion, but approved, the point of sale 110 may indicate that the payment transaction was approved and the consumer 106 and the merchant may finalize the payment transaction, such as by furnishing a receipt and transacted-for goods or services to the consumer 106. Additional data regarding the traditional processing of payment transactions is discussed in more detail below with respect to the process 700 illustrated in FIG. 7. In instances where the payment transaction is approved for conversion, the point of sale 110 may prompt the consumer 106 to enter a preference for processing of the payment transaction as a traditional, paid-in-full transaction, or conversion of the payment transaction to an installment. In instances where the issuing institution 104 may provide installment terms, the point of sale 110 may display the installment terms to the consumer 106 as part of the prompt.

The consumer 106 may input their selection into the point of sale 110 using traditional input methods, such as a keyboard or touch screen included as part of the point of sale 110. If the consumer 106 elects to process the payment transaction as a traditional payment transaction, then the merchant system 112 and acquiring institution 114 may perform additional functions associated with the traditional processing of payment transactions, including the submission of a clearing record to clear the payment transaction for the original transaction amount (e.g., or modified amount, as applicable, such as due to gratuity). Clearing records may be transaction messages indicated as clearing records (e.g., via message type indicators included therein) and associated with a prior authorization request for clearing of the payment transaction. The submission of a clearing record for an approved authorization request will be apparent to persons having skill in the relevant art.

If the consumer 106 elects to process the payment transaction as an installment transaction, the point of sale 110 may convey the selection to the merchant system 112, which may convey the selection to the acquiring institution 114. The acquiring institution 114 may then store the consumer's selection to process as an installment transaction in a suitable data element included in the clearing record. The clearing record may be electronically transmitted to the payment network 116 via the payment rails, and forwarded to the processing server 102.

The processing server 102 may forward the clearing record to the issuing institution 104 for clearing of the initial payment transaction. In some instances, the acquiring institution 114 may have modified the transaction amount in the clearing record to be a zero amount. In other instances, the processing server 102 may modify the transaction amount stored in the corresponding data element included in the clearing record to be a zero amount. The use of a zero amount may enable the issuing institution 104 to clear the payment transaction without debiting the consumer's transaction account. In other instances, the issuing institution 104 may debit the consumer's transaction account upon receipt of the clearing record. In such instances, the processing server 102 may initiate a credit on the transaction account for the transaction amount, to compensate for the debit.

The processing server 102 may also initiate a payment transaction for the first installment payment as part of the installment transaction. The installment payment may be made for the installment amount as indicated in the installment terms provided by the issuing institution 104 in the authorization response. In instances where installment terms may not have been provided, the processing server 102 may calculate the installment amount and other installment terms based on the transaction data and data set forth by the issuing institution 104. In some cases, the processing server 102 may query the issuing institution 104 for installment terms upon receipt of the clearing record with the indication that the payment transaction is to be converted to an installment. The processing server 102 may continue to initiate payment transactions for additional installment payments during the life of the installment, in compliance with the installment terms. The issuing institution 104 may, as part of the installment transaction, debit the consumer's transaction account accordingly when the payment transactions for the installment payments are processed.

The methods discussed herein may enable the consumer 106 and issuing institution 104 to participate in an installment transaction with minimal modification to existing legacy financial systems. The issuing institution 104 may be able to provide installment transactions to the consumer 106 by providing eligibility rules to the processing server 102 and by performing traditional processing of transaction messages. The processing server 102 may perform necessary eligibility checks and the initiation of installment payments to accommodate the conversion of a payment transaction to an installment transaction, with minimal or no disruption to the issuing institution 104.

In some embodiments, the processing server 102 may be configured to convert a payment transaction to an installment transaction after authorization based on instructions received from the issuing institution 104. In such embodiments, the processing server 102 may receive an authorization request for the payment transaction. The processing server 102 may determine eligibility of the payment transaction for conversion to an installment transaction based on eligibility rules, as discussed above. The processing server 102 may then forward the authorization request to the issuing institution 104, which includes the indication of eligibility of the payment transaction for conversion. The issuing institution 104 may then determine that the payment transaction is to be converted to an installment. The determination may be based on, for example, instructions received from the consumer 106, such as via a computing device used to interact with the issuing institution 104, such as via a web page or application program associated therewith.

The issuing institution 104 may return an instruction to the processing server 102 to convert the payment transaction to an installment. In some embodiments, the instruction may be included in an authorization response returned to the processing server 102, such as may be stored in a corresponding data element. In some instances, the instruction may include one or more installment terms for use in determining installment amounts, payment periods, etc. The processing server 102 may receive the instruction and may convert the payment transaction to an installment transaction. As discussed above, the conversion may include the initiating of a payment transaction for a first installment payment, for an installment amount based on the installment terms. In some instances, the conversion may also include the submission of a clearing record to the issuing institution 104 for the original payment transaction and, if applicable, the initiation of a credit transaction to credit the involved transaction account for the transaction amount.

In some embodiments of the system 100, the merchant involved in the payment transaction converted to an installment may receive the installment payments as made by the consumer 106. Such embodiments may be known as "merchant-funded" installments, where the merchant involved in the payment transaction is accepting the risk of lack of repayment by the consumer 106. In such an embodiment, the installment payments initiated by the processing server 102 may be for payment of the installment amount from the consumer 106 to the merchant involved in the original payment transaction. In some instances, the acquiring institution 114 may be paid in full, and may pay the merchant system 112 when each installment payment is to be made (e.g., even if not actually paid) by the consumer 106. In such an instance, the acquiring institution 114 may credit the merchant's transaction account at such times, such as based on instructions received from the processing server 102 based on the installment terms.

In other embodiments, the merchant may be paid in full at the time of the clearing of the original payment transaction. In one such embodiment, the installment may be an "issuer-funded" installment, wherein the installment may be funded by the issuing institution 104. In such an embodiment, the issuing institution 104 may pay the full transaction amount to the acquiring institution 114 upon receipt of the clearing record for the payment transaction, which may be credited to the merchant involved in the payment transaction. The issuing institution 104 may then be reimbursed by the consumer's installment payments, which may include a commission and/or associated fees above the transaction amount.

In another such embodiments, the installment may be an "acquirer-funded" installment, wherein the installment may be funded by the acquiring institution 114. In such an embodiment, the original payment transaction may be cleared for a zero amount, or otherwise cleared such that the issuing institution 104 does not pay the acquiring institution 114 for the payment transaction. The installment payments initiated by the processing server 102 may be for payment from the consumer 106 to the acquiring institution 114, or for payment from the consumer 106 to the issuing institution 104, with a settlement of the installment amount (e.g., plus a commission and associated fees) from the issuing institution 104 to the acquiring institution 114.

The methods and systems discussed herein may enable the post-authorization conversion of a payment transaction to an installment. Such systems may enable issuing institutions 104 and other entities involved in a payment transaction (e.g., acquiring institutions 114, merchants, etc.) to participate in an installment transaction without modification to existing financial systems. The processing server 102 may facilitate the conversion of a payment transaction to an installment that is funded by the issuing institution 104, acquiring institution 114, or the merchant, which may be initiated by the consumer 106 following the processing of the original payment transaction. For instance, the consumer 106 may decline to process the payment transaction as an installment initially at the point of sale 110, or may be unable to make a selection due to limitations of the point of sale 110. In such an instance, the consumer 106 may still be able to convert a payment transaction to an installment transaction due to the technological improvements to the system 100 provided by the processing server 102.

Processing Server

Figure 2:
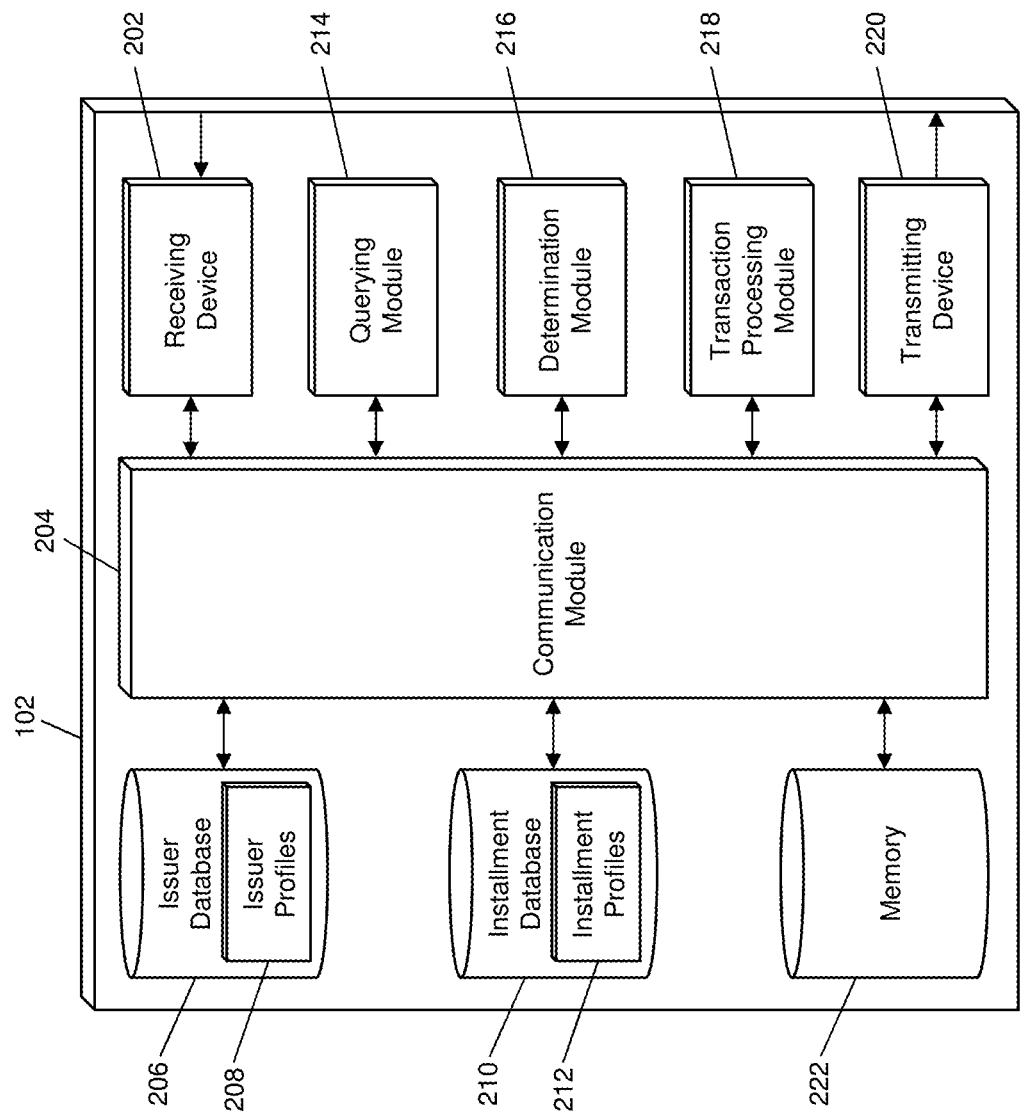
FIG. 2 is a block diagram illustrating the processing server of FIG. 1 for the initiation and processing of installment transactions with eligibility check requirements in accordance with exemplary embodiments.

FIG. 2 illustrates an embodiment of a processing server 102 of the processing system 102 in the system 100. It will be apparent to persons having skill in the relevant art that the embodiment of the processing server 102 illustrated in FIG. 2 is provided as illustration only and may not be exhaustive to all possible configurations of the computing systems 200 of the processing system 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from issuing institutions 104, acquiring institutions 114, payment networks 116, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 114 via payment rails associated therewith that may be superimposed or otherwise encoded with transaction messages. Transaction messages may be formatted pursuant to one or more standards, such as the ISO 8583 or 20022 standards, and include a message type indicator and a plurality of data elements, such as data elements configured to store primary account numbers, installment indicators, installment terms, installment preferences, and other transaction data, such as transaction amounts, transaction times, transaction dates, geographic locations, merchant data, product data, etc. The receiving device 202 may also be configured to receive data signals electronically transmitted by issuing institutions 104 that may be superimposed or otherwise encoded with transaction messages, such as authorization responses for payment transactions that indicate approval or denial of the payment transaction and indications for conversion of payment transactions to installment transactions. The receiving device 202 may also receive data signals from issuing institutions 104 that may be superimposed or otherwise encoded with instructions and/or confirmations regarding the conversion of a payment transaction to an installment transaction, which may include or otherwise be accompanied by installment terms used in the conversion.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, determination module 216, transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an issuer database 206. The issuer database 206 may be configured to store a plurality of issuer profiles 208 using a suitable data storage format and schema. The issuer database 206 may be a relational database that utilizes structured query language for the storage, identification, modifying, updating, accessing, etc. of structured data sets stored therein. Each issuer profile 208 may be a structured data set configured to store data related to one or more issuing institutions 104. Each issuer profile 208 may include at least an identification number and one or more eligibility rules. The identification number may be a number associated with the related issuing institution 104 and/or the issuer profile 208 for identification thereof. The identification number may be an issuer identification number (IIN), bank identification number (BIN), or other value, and may be included in primary account numbers corresponding to transaction accounts issued by the related issuing institution 104. In some instances, an issuer profile 208 may include a plurality of identification numbers, such as in instances where the included eligibility rules may be applicable to a plurality of different transaction accounts, IIN ranges, or BIN ranges.

The one or more eligibility rules may include criteria associated with data stored in data elements included in a transaction message, and may indicate a positive or negative result of eligibility of the related payment transaction for conversion into an installment. For instance, an eligibility rule may indicate that a transaction having a transaction amount under $100 is ineligible for conversion. In some instances, an eligibility rule may have multiple criteria (e.g., a transaction amount must be above $500 and the merchant category code must indicate an electronics retailer). In some cases, a payment transaction may be eligible for conversion if the transaction data satisfies at least one eligibility rule. For example, an issuer profile 208 may have multiple eligibility rules with multiple criteria such that, if any eligibility rule is satisfied, the payment transaction may be converted to an installment transaction.

The processing server 102 may also include an installment database 210. The installment database 210 may be configured to store a plurality of installment profiles 212 using a suitable data storage format and schema. The installment database 210 may be a relational database that utilizes structured query language for the storage, identification, modifying, updating, accessing, etc. of structured data sets stored therein. Each installment profile 212 may be a structured data set configured to store data related to an installment transaction. Each installment profile 212 may include an identification value and one or more installment terms. The identification value may be a transaction identifier or other value used for the identification of the installment profile 212, related installment transaction, and/or associated payment transaction. The one or more installment terms may be terms used in the initiation of installment payments and management thereof. The one or more installment terms may include, for example, installment amount, total amount, installment period, installment length, number of payments, fee amounts, commission, annual percentage rate, interest rate, etc. The installment profile 212 may also include data associated with installment payments as they are made by the consumer 106 involved in the related installment transaction. For example, the installment profile 212 may keep track of a consumer's payments, which may be used in the initiation of later installment payments or used for early repayment of the installment.

The processing server 102 may include a querying module 214. The querying module 214 may be configured to execute queries on databases to identify information. The querying module 214 may receive one or more data values or query strings, and may execute a query string based thereon on an indicated database, such as the issuer database 206, to identify information stored therein. The querying module 214 may then output the identified information to an appropriate engine or module of the processing server 102 as necessary. The querying module 214 may, for example, execute a query on the issuer database 206 to identify an issuer profile 208 associated with a received authorization request, based on the inclusion of the identification number in the issuer profile 208 in the primary account number stored in the corresponding data element included in the authorization request.

The processing server 102 may also include a determination module 216. The determination module 216 may be configured to perform eligibility checks for payment transactions to determine eligibility of a payment transaction for conversion into an installment transaction. The determination module 216 may receive an authorization request as input, may determine eligibility of the related payment transaction for conversion to an installment transaction, and may output the determination to another module or engine of the processing server 102. The determination module 216 may be configured to instruct the querying module 214 to execute a query on the issuer database 206 to identify an issuer profile 208 related to an authorization request and may determine eligibility of the related payment transaction via application of the one or more eligibility rules included in the identified issuer profile 208 to the transaction data stored in the corresponding data elements included in the authorization request. In some embodiments, the determination module 216 may be configured to update data elements in a transaction message based on performed determinations. For instance, the determination module 216 may remove or otherwise modify an installment indicator stored in a corresponding data element included in an authorization request if a payment transaction is determined to be ineligible for conversion.

The processing server 102 may also include a transaction processing module 218. The transaction processing module 218 may be configured to perform functions related to the initiation and processing of payment transactions. The transaction processing module 218 may be configured to, for example, initiate payment transactions, parse data from transaction messages, generate and/or modify transaction messages, identify issuing institutions 104 and acquiring institutions 114 associated with a transaction message, instruct other modules or engines of the processing server 102 for the routing and receipt of transaction messages, etc. The transaction processing module 218 may be configured to initiate payment transactions for installment payments for a payment transaction converted into an installment transaction. In such cases, the payment transaction for an installment payment may be initiated via the generation and submission of an authorization request for payment of the installment payment (e.g., as the transaction amount stored in the corresponding data element) from the transaction account used in the underlying payment transaction (e.g., via storage of the corresponding primary account number in the corresponding data element). In some instances, the transaction processing module 218 may also be configured to initiate transactions for the crediting of a transaction account following conversion of a payment transaction into an installment transaction, such as to credit a consumer's transaction account for the transaction amount if the underlying payment transaction is cleared for the full transaction amount.

The processing server 102 may also include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 116 for the transmission of transaction messages that include sensitive financial data and information, such as identified payment credentials. In some instances, the transmitting device 220 may be configured to transmit data to issuing institutions 104, acquiring institutions 114, payment networks 116, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to issuing institutions 104 and payment networks 106 that are superimposed or otherwise encoded with transaction messages. The transaction messages may be formatted pursuant to one or more standards, such as the ISO 8583 and ISO 20022 standards. The transaction messages may be authorization requests or authorization responses, and include a plurality of data elements including data elements configured to store installment indicators, installment terms, installment eligibility data, installment preferences, etc. The transmitting device 220 may also be configured to electronically transmit transaction messages to payment networks 116 and/or issuing institutions 114 as part of the initiation of installment payments from a consumer 106 involved in a payment transaction converted to an installment transaction. In some embodiments, the transmitting device 220 may also be configured to electronically transmit data signals to acquiring institutions 114, which may be superimposed or otherwise encoded with installment terms for a converted payment transaction, which may be used by the acquiring institution 114 in the crediting of a merchant's transaction account based on installment payments and/or a payment schedule associated therewith.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Process for Conversion of an Installment Transaction Via Consumer Preference

Figure 3:
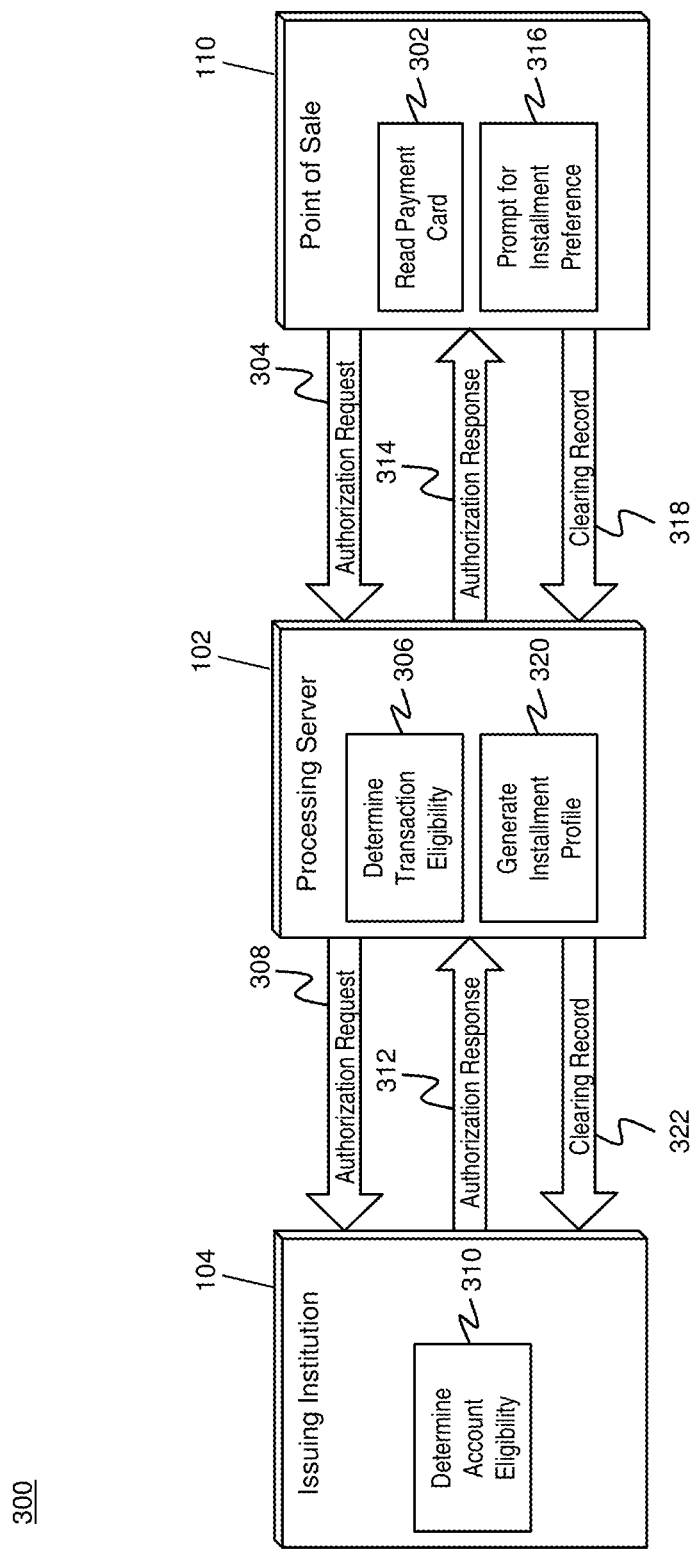
FIG. 3 is a flow diagram illustrating a process for processing of a payment transaction as an installment transaction with eligibility check and consumer preference using the system of FIG. 1 in accordance with exemplary embodiments.

FIG. 3 illustrates a process 300 for the conversion of a payment transaction to an installment transaction based on consumer preference following the use of installment eligibility checks.

In step 302, the point of sale 110 may read a payment card 108 or other payment instrument presented by a consumer 106 for the reading of payment details encoded therein or otherwise electronically transmitted thereby. The payment details may include at least a primary account number corresponding to the transaction account related to the payment card 108. The payment details, along with additional transaction data related to a payment transaction being initiated by the consumer 106 at the merchant related to the point of sale 110 may be electronically transmitted to the acquiring institution 114 and submitted to the payment network 116 in an authorization request. In step 304, the authorization request may be electronically transmitted to the processing server 102 via the payment rails associated with the payment network 116 and received by the receiving device 202 of the processing server 102. The authorization request may include a plurality of data elements including at least a first data element configured to store the primary account number, a second data element configured to store an installment indicator, indicating that the point of sale 110 is configured to prompt the consumer 106 for installment preference, and one or more data elements configured to store additional transaction data.

In step 306, the determination module 216 of the processing server 102 may perform an eligibility check to determine of the payment transaction is eligible for conversion to an installment transaction. The eligibility check may be based on the application of one or more eligibility rules to the transaction data stored in the corresponding data elements included in the authorization request. The one or more eligibility rules may be identified in an issuer profile 208 (e.g., identified via the querying module 214 of the processing server 102) related to the issuing institution 104 involved in the payment transaction, which may be identified based on inclusion of the corresponding identification number in the primary account number stored in the corresponding data element included in the authorization request. If a positive determination is made (e.g., the payment transaction is eligible for conversion), the transaction processing module 218 of the processing server 102 may modify the second data element or a third data element of the authorization request to indicate that the eligibility check was performed with a positive determination resulting.

In step 308, the transmitting device 220 of the processing server 102 may forward the authorization request, with indication of the positive eligibility check, to the issuing institution 104. The issuing institution 104 may receive the authorization request and, in step 310, may determine if the transaction account is eligible for converting the payment transaction into an installment. This eligibility check may use one or more eligibility rules in addition to the eligibility rules used by the processing server 102 in the eligibility check, such as based on an account balance of the transaction account, which may be unavailable to the processing server 102. The issuing institution 104 may determine that the payment transaction is eligible for conversion and may store an eligibility indicator in the second, third, or a fourth data element of the authorization request. The issuing institution 104 may also convert the authorization request into an authorization response by modification of the message type indicator, and may store a response code indicating that the payment transaction is approved (e.g., as applicable, based on business as usual processing) in a corresponding data element.

In step 312, the issuing institution 104 may electronically transmit the authorization response to the processing server 102, to be received by the receiving device 202 of the processing server 102. In step 314, the transmitting device 220 of the processing server 102 may forward the authorization response to the payment network 116, which may in turn forward the authorization response to the acquiring institution 114, which may inform the merchant system 112 and subsequently the point of sale 110 of the positive eligibility of the payment transaction for conversion into an installment transaction. In step 316, the point of sale 110 may prompt the consumer 106 for exercising of an installment preference. The prompt may be made using a display device or other suitable device (e.g., a speaker, tactile feedback device, etc.) to inform the consumer 106 that the payment transaction may be converted into an installment transaction. In some instances, the prompt may include installment terms, which may be provided by the issuing institution 104 and/or the processing server 102 in the authorization response. As part of the prompting, the consumer 106 may, using a suitable input device of the point of sale 110, elect to exercise their installment preference to convert the payment transaction to an installment transaction.

The point of sale 110 may convey the preference to the merchant system 112, which may forward the preference to the acquiring institution 114. The acquiring institution 114 may generate a clearing record for the payment transaction that includes a data element (e.g., the second, third, fourth, or a fifth data element) configured to store the installment preference. In step 318, the clearing record for the payment transaction may be electronically transmitted to the processing server 102, to be received by the receiving device 202 of the processing server 102.

In step 320, the querying module 214 of the processing server 102 may execute a query on the installment database 210 of the processing server 102 to generate a new installment profile 212 related to the installment transaction as converted from the payment transaction. The installment profile 212 may include the installment terms for the installment transaction and a transaction identifier associated with the payment transaction, such as may be stored in a corresponding data element included in the clearing record, authorization request, and/or authorization response. In some embodiments, step 320 may also include the initiation of the first installment payment. In step 322, the transmitting device 220 of the processing server 102 may forward the clearing record to the issuing institution 104, which may then clear the payment transaction using traditional processes. In embodiments where the payment transaction may be cleared for the full transaction amount, the processing server 102 may also (e.g., via the transaction processing module 218) initiate the payment of a credit for the transaction amount to the transaction account used in the payment transaction.

Process for Post-Authorization Conversion of an Installment

Figure 4:
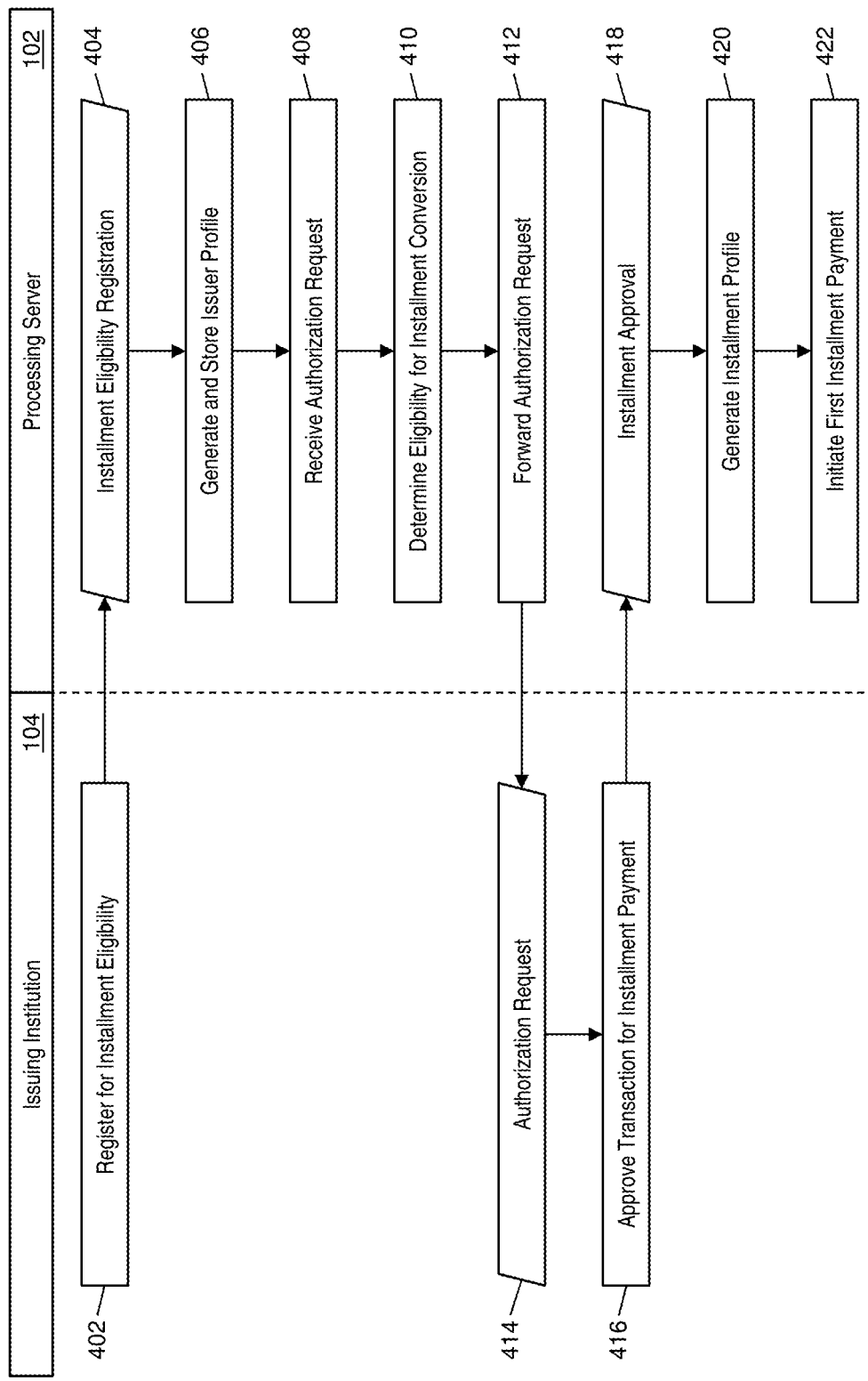
FIG. 4 is a flow diagram illustrating a process for the post-authorization initiation of an installment transaction with eligibility check requirements using the processing server of FIG. 2 in accordance with exemplary embodiments.

FIG. 4 illustrates a process for the conversion of a payment transaction to an installment transaction post authorization of the payment transaction. In some embodiments, the process illustrated in FIG. 4 may be performed in conjunction with the process 300 illustrated in FIG. 3.

In step 402, the issuing institution 104 may register with the processing server 102 for the management and processing of eligibility checks for installment transactions and conversion of payment transactions thereto. As part of the registration, the issuing institution 104 may electronically transmit a data signal to the processing server 102 that is superimposed or otherwise encoded with at least one identification number and one or more associated eligibility rules. In step 404, the receiving device 202 of the processing server 102 may receive the registration data. In step 406, the querying module 214 of the processing server 102 may execute one or more queries on the issuer database 206 of the processing server 102 to store at least one issuer profile 208 therein related to the issuing institution 104. Each issuer profile 208 may include at least one identification number provided by the issuing institution 104 and the associated one or more eligibility rules.

In step 408, the receiving device 202 of the processing server 102 may receive an authorization request for a payment transaction. The authorization request may be received via payment rails associated with a payment network 116 and may be formatted pursuant to one or more standards, such as the ISO 8583 or ISO 20022 standards. The authorization request may be a transaction message with a message type indicator indicative of an authorization request and may include a plurality of data elements including at least a first data element configured to store a primary account number and one or more additional data elements configured to store transaction data. In step 410, the processing server 102 may determine if the payment transaction is eligible for conversion to an installment transaction. As part of the determination, the querying module 214 of the processing server 102 may execute a query on the issuer database 206 to identify an issuer profile 208 where the included identification number is included in the primary account number stored in the first data element included in the authorization request, and the determination module 216 of the processing server 102 may apply the associated one or more eligibility rules to the transaction data stored in the additional data elements included in the authorization request. The transaction processing module 218 may store the result of the determination in a second data element included in the authorization request.

In step 412, the transmitting device 220 may forward the authorization request, with the eligibility determination included therein, to the issuing institution 104 via a suitable communication network and method, such as the payment rails associated with the payment network 116. In step 414, the issuing institution 104 may receive the authorization request. The issuing institution 104 may perform any eligibility checks as necessary, and may also perform any other approval processes (e.g., using standard transaction processing techniques), to determine that the payment transaction is approved and to be converted into an installment transaction. In some instances, the approval may include calculation or other determination of one or more installment terms for the converted installment transaction. In step 416, the issuing institution 104 may electronically transmit a data signal to the processing server 102 superimposed or otherwise encoded with the approval for conversion of the payment transaction into an installment. In some instances, the approval may be stored in a data element included in an authorization response that is transmitted to the processing server 102.

In step 418, the receiving device 202 of the processing server 102 may receive the approval for conversion of the payment transaction. In step 420, the querying module 214 of the processing server 102 may execute a query on the installment database 210 of the processing server 102 to generate an installment profile for the payment transaction's conversion to an installment transaction. The installment profile may include a transaction identifier or other identification value associated with the payment transaction and may also include one or more installment terms. The one or more installment terms may be parsed from the approval provided by the issuing institution 104, or may be determined by the processing server 102 (e.g., by the determination module 216, transaction processing module 218, or other suitable module or engine), such as based on criteria provided by the issuing institution 104 during registration, the transaction data for the payment transaction, or other suitable data. In step 422, the transaction processing module 218 may initiate a payment transaction for the first installment payment to be made from the consumer 106 involved in the payment transaction. The installment amount may be based on the installment terms, and the installment payment may be made from the transaction account used in the original payment transaction, by inclusion of the corresponding primary account number in an authorization request generated for the installment payment.

Exemplary Method for Processing a Transaction with Installment Checks

Figure 5:
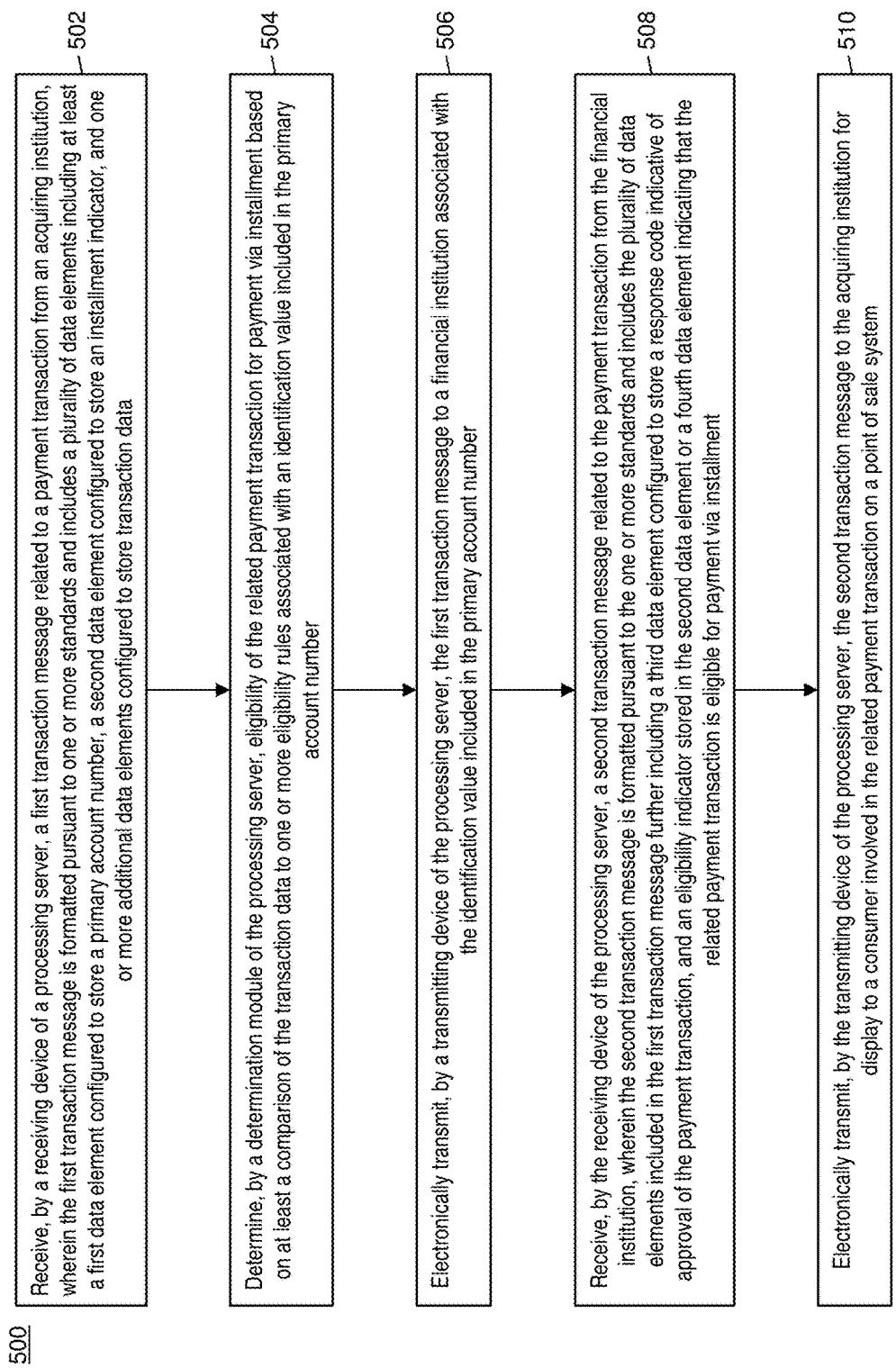
FIG. 5 is a flow chart illustrating an exemplary method for processing a transaction with installment checks in accordance with exemplary embodiments.

FIG. 5 illustrates a method 500 for the processing of a payment transaction with installment eligibility checks for conversion of the payment transaction into an installment transaction.

In step 502, a first transaction message related to a payment transaction may be received by a receiving device (e.g., the receiving device 202) of a processing server (e.g., the processing server 102) from an acquiring institution (e.g., the acquiring institution 114), wherein the first transaction message is formatted pursuant to one or more standards and includes a plurality of data elements including at least a first data element configured to store a primary account number, a second data element configured to store an installment indicator, and one or more additional data elements configured to store transaction data. In step 504, eligibility of the related payment transaction for payment via installment may be determined by a determination module (e.g., the determination module 216) of the processing server based on at least a comparison of the transaction data to one or more eligibility rules associated with an identification value included in the primary account number.

In step 506, the first transaction message may be electronically transmitted by a transmitting device (e.g., the transmitting device 220) of the processing server to a financial institution (e.g., the issuing institution 104) associated with the identification value included in the primary account number. In step 508, a second transaction message related to the payment transaction may be received by the receiving device of the processing server from the financial institution, wherein the second transaction message is formatted pursuant to the one or more standards and includes the plurality of data elements included in the first transaction message further including a third data element configured to store a response code indicative of approval of the payment transaction, and an eligibility indicator stored in the second data element or a fourth data element indicating that the related payment transaction is eligible for payment via installment. In step 510, the second transaction message may be electronically transmitted by the transmitting device of the processing server to the acquiring institution for display to a consumer involved in the related payment transaction on a point of sale system (e.g., the point of sale 110).

In one embodiment, the method 500 may further include: receiving, by the receiving device of the processing server, a third transaction message related to the payment transaction from the acquiring institution, wherein the third transaction message is formatted pursuant to the one or more standards and includes the plurality of data elements included in the second transaction message further including an indication of installment acceptance in the second data element, the fourth data element, or a fifth data element; and electronically transmitting, by the transmitting device of the processing server, the third transaction message to the financial institution. In some embodiments, the method 500 may also include: storing, in an issuer database (e.g., the issuer database 206) of the processing server, a plurality of issuer profiles (e.g., issuer profiles 208), wherein each issuer profile includes a structured data set related to a financial institution including at least an identification number and at least one eligibility rule; and executing, by a querying module (e.g., the querying module 214) of the processing server, a query on the issuer database to identify a specific issuer profile where the included identification number corresponds to the identification value included in the primary account number, wherein the one or more eligibility rules correspond to the at least one eligibility rule included in the identified specific issuer profile.

In one embodiment, the one or more standards may include one of: the ISO 8583 and ISO 20022 standards. In some embodiments, the transaction data may include at least one of: transaction amount, transaction time, transaction date, geographic location, merchant identification number, merchant category code, merchant name, product data, offer data, reward data, loyalty data, and acquirer data.

Exemplary Method for Post-Authorization Generation of an Installment

Figure 6:
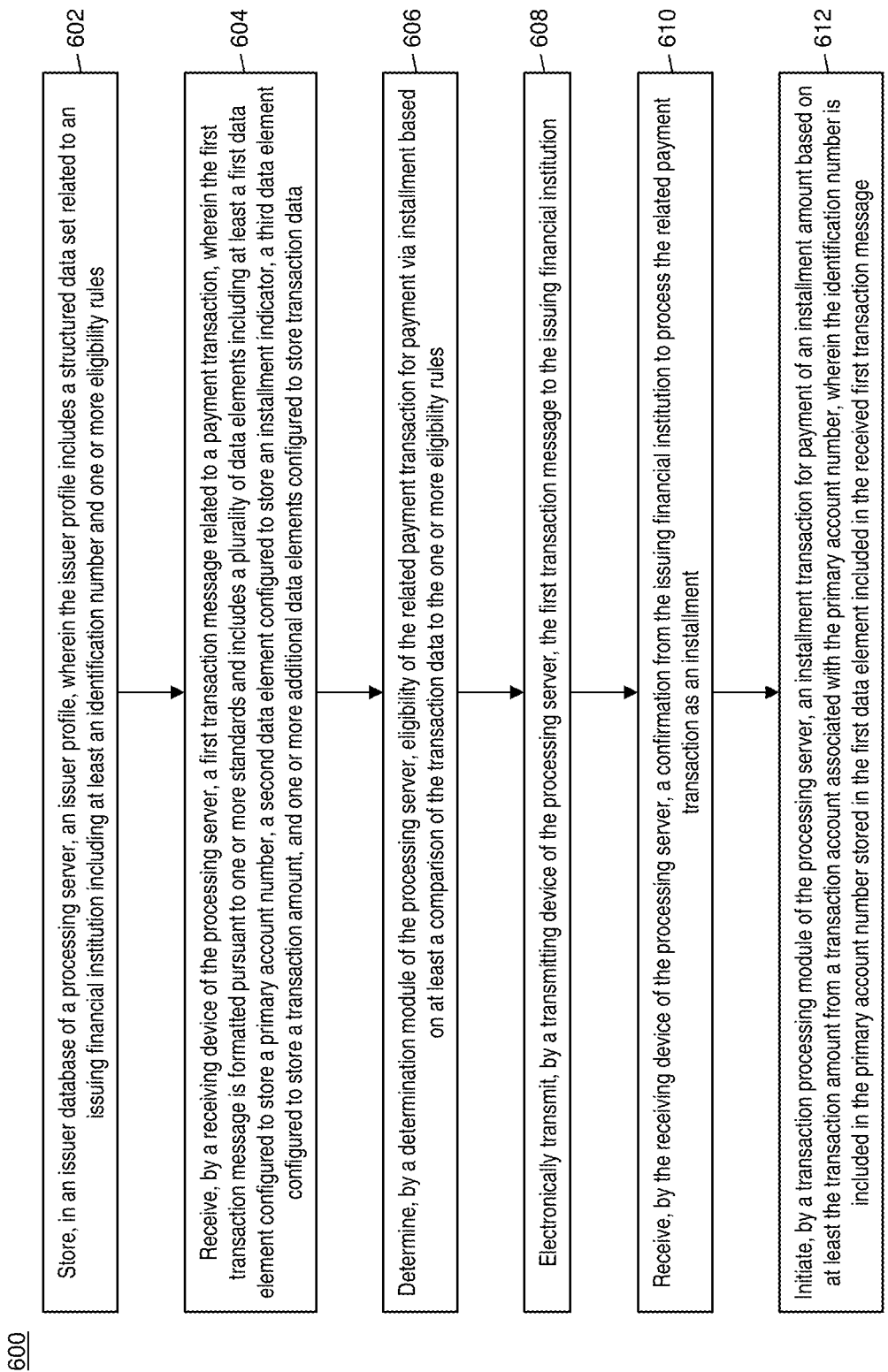
FIG. 6 is a flow chart illustrating an exemplary method for post-authorization generation of an installment in accordance with exemplary embodiments.

FIG. 6 illustrates a method 600 for the post-authorization conversion of a payment transaction into an installment transaction.

In step 602, an issuer profile (e.g., issuer profile 208) may be stored in an issuer database (e.g., the issuer database 206) of a processing server (e.g., the processing server 102), wherein the issuer profile includes a structured data set related to an issuing financial institution (e.g., the issuing institution 104) including at least an identification number and one or more eligibility rules. In step 604, a first transaction message related to a payment transaction may be received by a receiving device (e.g., the receiving device 202) of the processing server, wherein the first transaction message is formatted pursuant to one or more standards and includes a plurality of data elements including at least a first data element configured to store a primary account number, a second data element configured to store an installment indicator, a third data element configured to store a transaction amount, and one or more additional data elements configured to store transaction data.

In step 606, eligibility of the related payment transaction for payment via installment may be determined by a determination module (e.g., the determination module 216) of the processing server based on at least a comparison of the transaction data to the one or more eligibility rules. In step 608, the first transaction message may be electronically transmitted by a transmitting device (e.g., the transmitting device 220) of the processing server to the issuing financial institution.

In step 610, a confirmation may be received by the receiving device of the processing server from the issuing financial institution to process the related payment transaction as an installment. In step 612, an installment transaction for payment of an installment amount may be initiated by a transaction processing module (e.g., the transaction processing module 218) of the processing server based on at least the transaction amount from a transaction account associated with the primary account number, wherein the identification number is included in the primary account number stored in the first data element included in the received first transaction message.

In one embodiment, the issuer profile may further include one or more installment terms, and the installment amount may be further based on application of the one or more installment terms to the transaction amount. In some embodiments, the plurality of data elements may further include a fourth data element configured to store the installment amount. In one embodiment, the confirmation may further include the installment amount. In some embodiments, the one or more standards may include one of: the ISO 8583 and ISO 20022 standards.

Payment Transaction Processing System and Process

Figure 7:
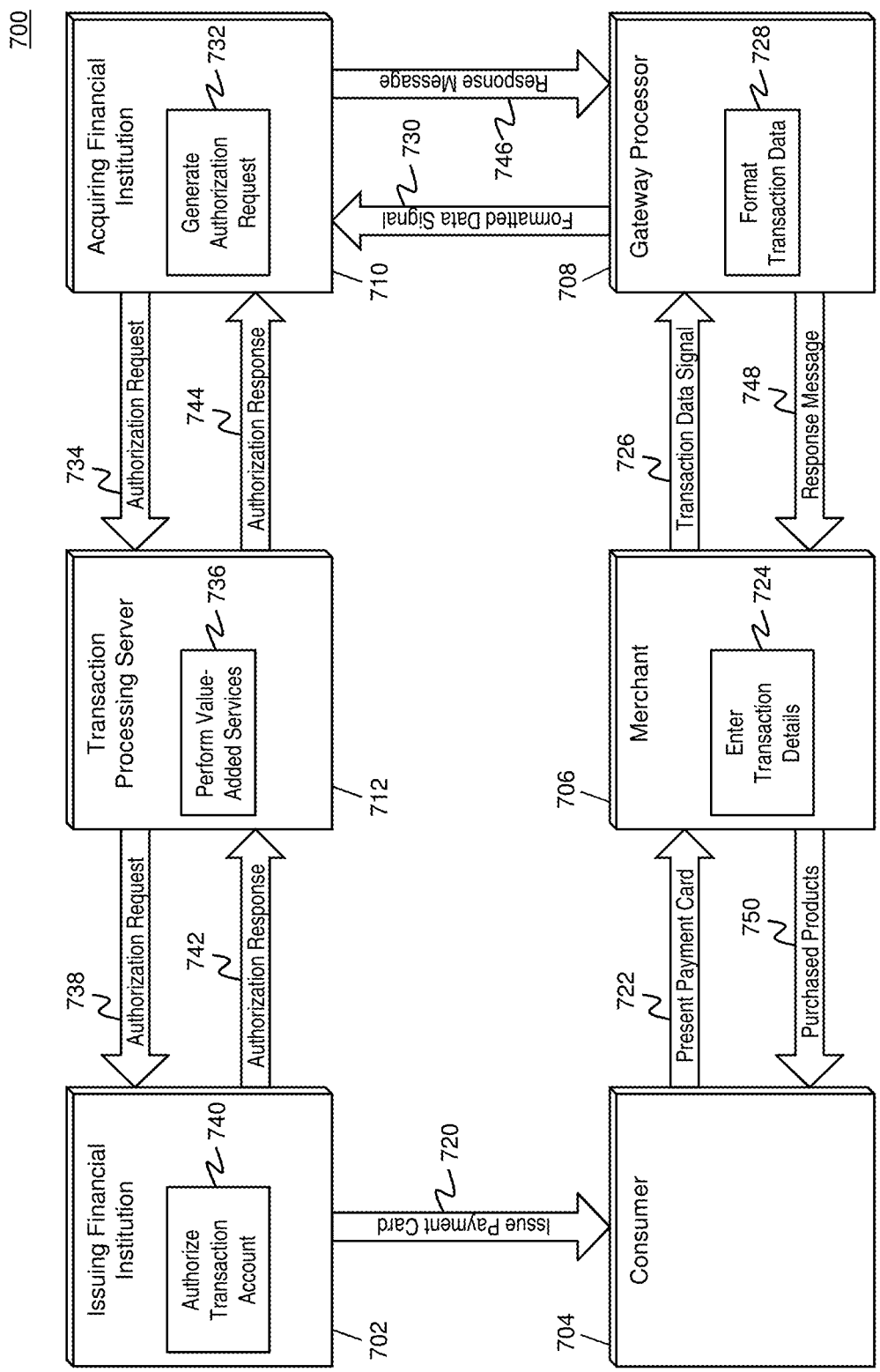
FIG. 7 is a flow diagram illustrating the processing of a payment transaction in accordance with exemplary embodiments.

FIG. 7 illustrates a transaction processing system and a process 700 for the processing of payment transactions in the system, which may include the processing of thousands, millions, or even billions of transactions during a given period (e.g., hourly, daily, weekly, etc.). The process 700 and steps included therein may be performed by one or more components of the system 100 discussed above, such as the processing server 102, issuing institution 104, consumer 106, payment card 108, point of sale 110, merchant system 112, acquiring institution 114, payment network 116, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
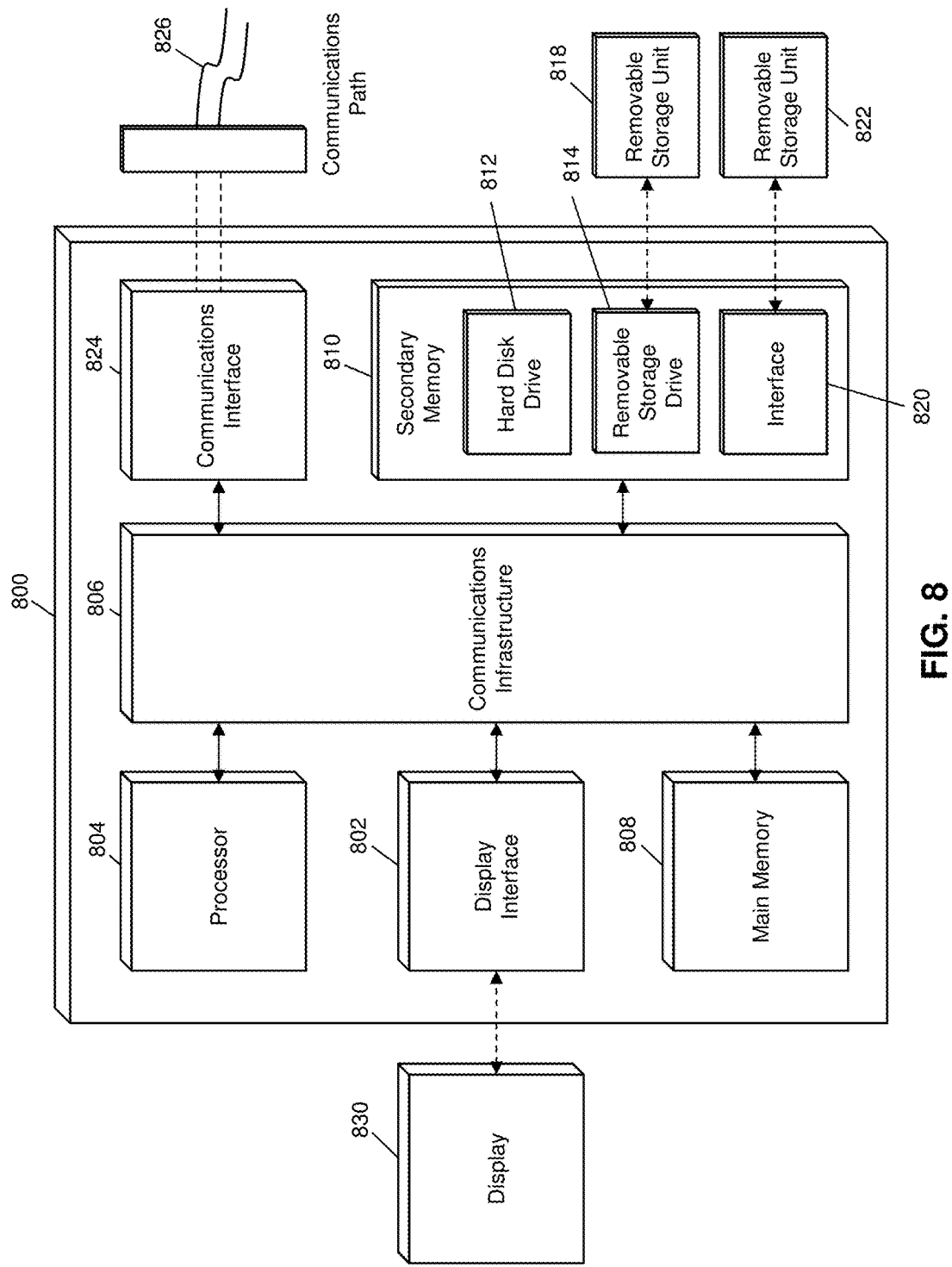
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for processing transactions with installment checks and post-authorization generation of installments. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a transaction with installment checks, comprising:
receiving, by a receiving device of a processing server, a first transaction message related to a payment transaction from an acquiring institution, wherein the first transaction message includes a plurality of data elements including at least a first data element storing a primary account number, a second data element storing an installment indicator, and one or more additional data elements storing transaction data;
performing, by a determination module of the processing server, an eligibility check for the payment transaction to determine whether the payment transaction is eligible for conversion to an installment transaction, said eligibility check being performed by applying one or more eligibility rules associated with an identification value included in the primary account number to the transaction data;
in response to a positive determination, modifying the second data element or the third data element of the first transaction message to indicate that that eligibility check was performed with a positive determination;
electronically transmitting, by a transmitting device of the processing server, the modified first transaction message to a financial institution associated with the identification value included in the primary account number;
receiving, by the receiving device of the processing server, a second transaction message related to the payment transaction from the financial institution, wherein the second transaction message includes the plurality of data elements included in the first transaction message further including (i) a third data element storing a response code indicative of approval of the payment transaction, and (ii) an eligibility indicator stored in the second data element or a fourth data element indicating that the related payment transaction is eligible for payment via installment; and
electronically transmitting, by the transmitting device of the processing server, the second transaction message to the acquiring institution for display to a consumer involved in the related payment transaction on a point of sale system.

2. The method of claim 1, further comprising:
receiving, by the receiving device of the processing server, a third transaction message related to the payment transaction from the acquiring institution, wherein the third transaction message is formatted pursuant to the one or more standards and includes the plurality of data elements included in the second transaction message further including an indication of installment acceptance in the second data element, the fourth data element, or a fifth data element; and
electronically transmitting, by the transmitting device of the processing server, the third transaction message to the financial institution.

3. The method of claim 1, further comprising:
storing, in an issuer database of the processing server, a plurality of issuer profiles, wherein each issuer profile includes a structured data set related to a financial institution including at least an identification number and at least one eligibility rule; and
executing, by a querying module of the processing server, a query on the issuer database to identify a specific issuer profile where the included identification number corresponds to the identification value included in the primary account number, wherein the one or more eligibility rules correspond to the at least one eligibility rule included in the identified specific issuer profile.

4. The method of claim 1, wherein the one or more standards includes one of: the ISO 8583 and ISO 20022 standards.

5. The method of claim 1, wherein the transaction data includes at least one of:
transaction amount, transaction time, transaction date, geographic location, merchant identification number, merchant category code, merchant name, product data, offer data, reward data, loyalty data, and acquirer data.

6. A system for processing a transaction with installment checks, comprising:
a receiving device of a processing server configured to receive a first transaction message related to a payment transaction from an acquiring institution, wherein the first transaction message includes a plurality of data elements including at least a first data element storing a primary account number, a second data element storing an installment indicator, and one or more additional data elements storing transaction data;
a determination module of the processing server configured to perform an eligibility check for the payment transaction to determine whether the payment transaction is eligible for conversion to an installment transaction, said eligibility check is performed by applying one or more eligibility rules associated with an identification value included in the primary account number to the transaction data, wherein in response to a positive determination, the processing server modifies the second data element or the third data element of the first transaction message to indicate that that eligibility check was performed with a positive determination; and
a transmitting device of the processing server configured to electronically transmit the modified first transaction message to a financial institution associated with the identification value included in the primary account number,
wherein the receiving device of the processing server is further configured to receive a second transaction message related to the payment transaction from the financial institution,
wherein the second transaction message includes the plurality of data elements included in the first transaction message further including a third data element storing a response code indicative of approval of the payment transaction, and an eligibility indicator stored in the second data element or a fourth data element indicating that the related payment transaction is eligible for payment via installment, and
wherein the transmitting device of the processing server is further configured to electronically transmit the second transaction message to the acquiring institution for display to a consumer involved in the related payment transaction on a point of sale system.

7. The system of claim 6, wherein the receiving device of the processing server is further configured to receive a third transaction message related to the payment transaction from the acquiring institution, wherein the third transaction message is formatted pursuant to the one or more standards and includes the plurality of data elements included in the second transaction message further including an indication of installment acceptance in the second data element, the fourth data element, or a fifth data element, and the transmitting device of the processing server is further configured to electronically transmit the third transaction message to the financial institution.

8. The system of claim 6, further comprising:
an issuer database of the processing server configured to store a plurality of issuer profiles, wherein each issuer profile includes a structured data set related to a financial institution including at least an identification number and at least one eligibility rule; and
a querying module of the processing server configured to execute a query on the issuer database to identify a specific issuer profile where the included identification number corresponds to the identification value included in the primary account number, wherein the one or more eligibility rules correspond to the at least one eligibility rule included in the identified specific issuer profile.

9. The system of claim 6, wherein the one or more standards includes one of: the ISO 8583 and ISO 20022 standards.

10. The system of claim 6, wherein the transaction data includes at least one of: transaction amount, transaction time, transaction date, geographic location, merchant identification number, merchant category code, merchant name, product data, offer data, reward data, loyalty data, and acquirer data.

* * * * *